United States Patent
Chao

(10) Patent No.: US 9,544,265 B2
(45) Date of Patent: *Jan. 10, 2017

(54) TRACKING INTERACTIVE TEXT-MESSAGE COMMUNICATIONS

(71) Applicant: International Business Machines Corporation, Armonk, NY (US)

(72) Inventor: Li-Lung Chao, Dana Point, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,344

(22) Filed: Jun. 16, 2015

(65) Prior Publication Data

US 2015/0281165 A1 Oct. 1, 2015

Related U.S. Application Data

(63) Continuation of application No. 13/609,673, filed on Sep. 11, 2012, now Pat. No. 9,076,131, which is a continuation of application No. 12/022,367, filed on Jan. 30, 2008, now Pat. No. 8,312,095.

(51) Int. Cl.

| | |
|---|---|
| *G06F 15/16* | (2006.01) |
| *H04L 12/58* | (2006.01) |
| *G06Q 10/10* | (2012.01) |
| *H04L 12/18* | (2006.01) |
| *H04L 29/08* | (2006.01) |

(52) U.S. Cl.
CPC ............. *H04L 51/34* (2013.01); *G06Q 10/10* (2013.01); *H04L 12/1831* (2013.01); *H04L 12/5885* (2013.01); *H04L 67/22* (2013.01)

(58) Field of Classification Search
CPC ........ G06Q 50/01; G06Q 10/00; G06Q 10/10; G06F 17/30861; H04L 51/34; H04L 12/1831; H04L 12/5885
See application file for complete search history.

(56) References Cited

U.S. PATENT DOCUMENTS

| | | |
|---|---|---|
| 6,557,027 B1 | 4/2003 | Cragun |
| 6,594,670 B1 | 7/2003 | Genser |
| 6,792,448 B1 | 9/2004 | Smith |
| 7,039,677 B2 | 5/2006 | Fitzpatrick et al. |

(Continued)

OTHER PUBLICATIONS

"Yahoo! Answers", Yahoo!, Jun. 13, 2007, pp. 1-21.

(Continued)

*Primary Examiner* — Ryan Jakovac
(74) *Attorney, Agent, or Firm* — Patrick J. Daugherty; Driggs, Hogg, Daughery & Del Zoppo Co., LPA

(57) ABSTRACT

Internet or networked communication message items are selectively synchronized and tracked. An interactive communication application presents a message entry interface enabling a user to select a discrete question for tracking, creating tracking thread. The message is presented by visually distinguishing the tracked question from a remainder of message items, and the thread is updated in response to a reply message comprising a linked answer. A secondary tracking display interface presents thread pluralities and enables a user to select and resend an unanswered question or an unacknowledged answer. An answer may be automatically or explicitly linked to a question. Selecting or linking a question or answer may be effected through a cursor routine or special text string inputs, and the special text string inputs may be user defined.

20 Claims, 4 Drawing Sheets

(56) References Cited

U.S. PATENT DOCUMENTS

| | | |
|---|---|---|
| 7,165,119 B2 | 1/2007 | Fish |
| 7,200,635 B2 | 4/2007 | Yashchin et al. |
| 7,206,813 B2 | 4/2007 | Dunbar et al. |
| 8,312,095 B2 | 11/2012 | Chao |
| 2003/0023684 A1 | 1/2003 | Brown et al. |
| 2003/0229452 A1 | 12/2003 | Lewis et al. |
| 2005/0149621 A1 | 7/2005 | Kirkland et al. |
| 2006/0122979 A1 | 6/2006 | Kapur et al. |
| 2006/0206474 A1 | 9/2006 | Kapur et al. |
| 2006/0224587 A1 | 10/2006 | Zamir et al. |

OTHER PUBLICATIONS

Dhyani et al, A Survey of Web Metrics, 2002.
Kobayashi et al, Information retrieval on the Web, 2000.
Henninger, An evolutionary Approach to Constructing Effective Softward Reuse Repositories, ACM Transactions on Software Engineering and Methodology, 1997.
U.S. Appl. No. 13/609,673, filed Sep. 11, 2012.
Notice of Allowance (Mail Date Mar. 4, 2015) for U.S. Appl. No. 13/609,673, filed Sep. 11, 2012.

TRACKING INTERACTIVE TEXT-MESSAGE COMMUNICATIONS

FIELD OF THE INVENTION

The present invention generally relates to networked text-based communications, and more particularly to improved methods, systems, and program products for enabling interactive text-based communication system users to create, synchronize, and track individual message items.

BACKGROUND OF THE INVENTION

Computer systems provide multitasking environments wherein a user may concurrently run multiple on-line or networked applications which enable cooperative data processing with other parties (for one example see Lotus Notes®) and multiparty communications through real-time interactive communication applications such as Internet Relay Chat (IRC), Instant Messaging (IM), Web Browser, Chat-room and other applications. More particularly, real-time interactive communication applications enable the rapid exchange of a series of text-based message communications between a plurality of participating on-line parties. Real-time communication sessions may assume the efficient aspects of in-person conversations and conferences, wherein immediate feedback is received from a question or comment as soon as it is posed to and understood by the receiving party, and thus an issue or problem may be rapidly resolved through a cascading series of responsive communications as quickly as comments and responses may be composed and communicated by the parties. Thus, in one aspect, real-time interactive communications offer significant time-efficiency advantages over non-real-time means such as email, bulletin board and conventional postal service communications, wherein receipt and response to each message is necessarily delayed by the time required for delivery of each message to an intended party.

However, the rapid and immediate nature of real-time interactive communications presents problems in keeping track of individual messages or portions of messages. For example, real-time text-based interactive communication applications are generally configured to emphasize and display current incoming and outgoing messages in one window display at the expense of older messages, with each new message displayed immediately after a most recent previous outgoing or incoming message. As new messages are sent or received, older messages are effectively pushed out of the window to make room for the new ones. Such real-time interactive communications applications are thus generally configured with the immediacy aspects of real-time in-person oral conversations. Only the most recent messages are displayed in an on-line "conversation" for consideration and comment, much as the last spoken comments may be assumed to be the relevant comments at issue in a spoken conversation. Older less-ripe comments are sometimes disregarded unless restated in both oral conversations and in text-based on-line communication chats.

This type of configuration is problematic in text-based communications. Whereas in an oral conversation one party may easily and quickly restate an unanswered question or an answer not understood by another party, restatements in text-based communications require keyboarding and data entry operations that are cumbersome, annoying and often significantly slower for most users. Moreover, the apparent relevance of a given displayed text answer message may be lost or diminished to a receiving user as a function of time and proximity. Thus, when an answer is not immediately provided but is instead delayed, when received it may not be displayed adjacent to the instigating question message. Intervening messages created and sent and received in the time period between the asking and the answering will instead be interposed there between, in some cases pushing the original question off of the present display screen.

Furthermore, each user may ask multiple questions to one or more other users in any given on-line conversation, and each user may also be engaged in multiple real-time interactive communication application conversations at any one time. A user may also reply with another question or other non-responsive text message rather than an expected answer, or may answer only one of a series of pending questions. Or after originating a question, a user may switch to another task or close the real-time interactive communication application on-line session that contains all the questions and, thus, upon his return to the application in the present or a subsequent session, a displayed answer received in the intervening time period may not match up to the posed question.

Thus, unless an answer is received in an immediate, timely and direct response to a question without any intervening text on a user's display screen, problems may arise in recognizing question-answer correspondence and, in the case of multiple pending questions, in determining whether a given question has even been answered. Additionally, when a series of questions are posed and responsive answers are received out-of-sync, a user must remember the questions and understand the association of each answer; if instead an original question has been lost or forgotten then the user may have to re-type and resubmit the question. Such problems may result in time inefficiencies and aggravation, and perhaps in productivity and profit loss through on-line mishandled business opportunities (e.g. mishandled sales, customer service and help desk inquiries, etc.).

Other types of non-real-time text-based communication means avoid some of these problems through the associative nature of their formats. For example, a responsive email reply generally incorporates a previous email message between the same parties within the body of the email when it is composed through an email application "reply" option, thus inherently providing notice to the receiving party of the question or other issue that the email may be responsive or relevant to, and optionally including previous related emails within the body of the message as well. Bulletin board applications also directly associate each posted responses with an instigating posting, and further link all related messages in a message thread, also optionally organizing each message thread within subject matter categories and subcategories. However, such techniques are not appropriate for real-time text-based interactive communication applications.

More particularly, real-time text-based interactive communication applications are configured to enable rapid and copious message activity, and the much higher number of messages typically exchanged in an on-line conversation renders previous message incorporation and thread organization methods and systems unwieldy or impractical. Moreover, organizing some text-based communications into meaningful discrete "messages" for tracking may be difficult: for example, a user may pose a series of unrelated questions in one outgoing chat message, and thus considering all of the questions as one "message" for a thread or other message tracking configuration will not provide an indication as to which of the questions have been answered and which remain unanswered by any given reply message, nor would subsequent messages relevant to one of the questions be necessarily relevant to any of the other questions lumped into such a "thread" organization.

Prior art real-time interactive text-based communication applications provide only indirect and inefficient solutions to the problems of tracking and correlating chat, IM and IRC and other messages. Generally a user must scroll back and forth through a plurality of screens from any given message in order to find and identify a relevant instigating message or topic. In some applications, a log or message history database may provide a reference function, however log or message histories may be interrupted or corrupted by data loss at any point of the thread, for example if a user application crashes or improperly shuts down or exits without saving an appropriate log breaking the integrity of a history or log. Moreover, such history or log-based message organization approaches also generally lack an effective means for quickly determining whether any given question or other query message has in fact received a response, or which query any particular response may be satisfying.

SUMMARY OF THE INVENTION

Methods, program products and systems are provided for selectively synchronizing and tracking networked or internet communication message items. In one aspect, a programmable device component interactive communication application presents a message entry interface to a first user, wherein each message may comprise a plurality of discrete message items, the message entry interface enabling the first user to select one of the message items for tracking. A first user enters a query message comprising a plurality of discrete message items into the message entry interface, one of the discrete query message items comprising a question, the entering comprising selecting the question for tracking, the selecting of the question creating a question tracking thread. Sending the query message to a second user programmable device component interactive communication application presenting the message entry interface to a second user through a communication medium results in the second programmable device communication application displaying the query message to a second user by visually distinguishing the question from a remainder of the query message discrete message items. The first user programmable device is further configured to update the thread in response to a reply message comprising an answer sent back to the first user by the second user and linked to the question, and further to display the linked answer and the question to the first user by visually distinguishing the linked answer and the question from a remainder of reply message discrete message items and from a display of other message non-selected message items.

In some embodiments, the question thread may comprise a query message timestamp, question text, second user identification data, an answered status and a reply message answer field, wherein creating the thread comprises initializing the answered status to unanswered, and the first user programmable device is configured to update the thread in response to the reply message comprising an answer linked to the question by entering answer text into the reply message answer field and setting the answered status to answered.

In some embodiments, presenting each of a plurality of tracked selected question threads are presented to a user in a secondary tracking display interface, the secondary tracking display interface comprising a table of a plurality of threads of unanswered questions or a plurality of threads of unacknowledged answers. And in some embodiments, secondary tracking display interface table active threads are organized and presented with respect to an association of each thread with a user. Further, in some embodiments, the secondary tracking display interface enables a user to resend an unanswered question or an unacknowledged answer to another user by selecting a displayed unanswered question thread or an unacknowledged answer thread and entering a resend prompt into the secondary tracking interface; save a question thread to an off-line storage means by selecting a displayed question thread and entering a save prompt into the secondary tracking interface; or delete a question thread by selecting a displayed thread and entering a delete prompt into the secondary tracking interface.

In one aspect, linking an answer to the question may comprise a user explicitly linking the answer to the question. In another aspect, a user selecting the question, explicitly linking the answer, entering the delete prompt, entering the save prompt or entering the resend prompt comprises highlighting a question, answer or thread component through a cursor routine and clicking on a tool bar button through a cursor routine.

In some embodiments, selecting a question or linking an answer comprises entering a special text string input into a message text entry dialog box with question text or answer text. And in some embodiments, a user defines the special text string input for the communication application.

In another aspect, methods are provided for producing computer executable program code, storing the produced program code on a computer readable medium, and providing the program code to be deployed to and executed on a computer system thereby providing a computer infrastructure being operable to perform one or more of the method and/or process elements described above, for example by a service provider who offers to implement, deploy, and/or perform functions for others. Still further, an article of manufacture comprising a computer usable medium having the computer readable program embodied in said medium may be provided. Such program codes comprise instructions which, when executed on the computer system, cause a computer system to perform one or more of the method and/or process elements described above.

Moreover, systems, articles and programmable devices configured for performing one or more of the method and/or process elements of the present invention are also provided. In one embodiment, a programmable device configured for selectively synchronizing and tracking networked or internet communication messages and their responses comprises a processing means; a memory in communication with the processing means comprising a question and answer tracking interface presenter logic component, a tracked item display logic component, a thread creator/updater logic component and a tracked-item message sender logic component; and a network interface in communication with the processing means and the memory. In one aspect, a programmable device memory further comprises a secondary tracking table displayer logic component.

BRIEF DESCRIPTION OF THE DRAWINGS

These and other features of this invention will be more readily understood from the following detailed description of the various aspects of the invention taken in conjunction with the accompanying drawings in which.

Figure 1:
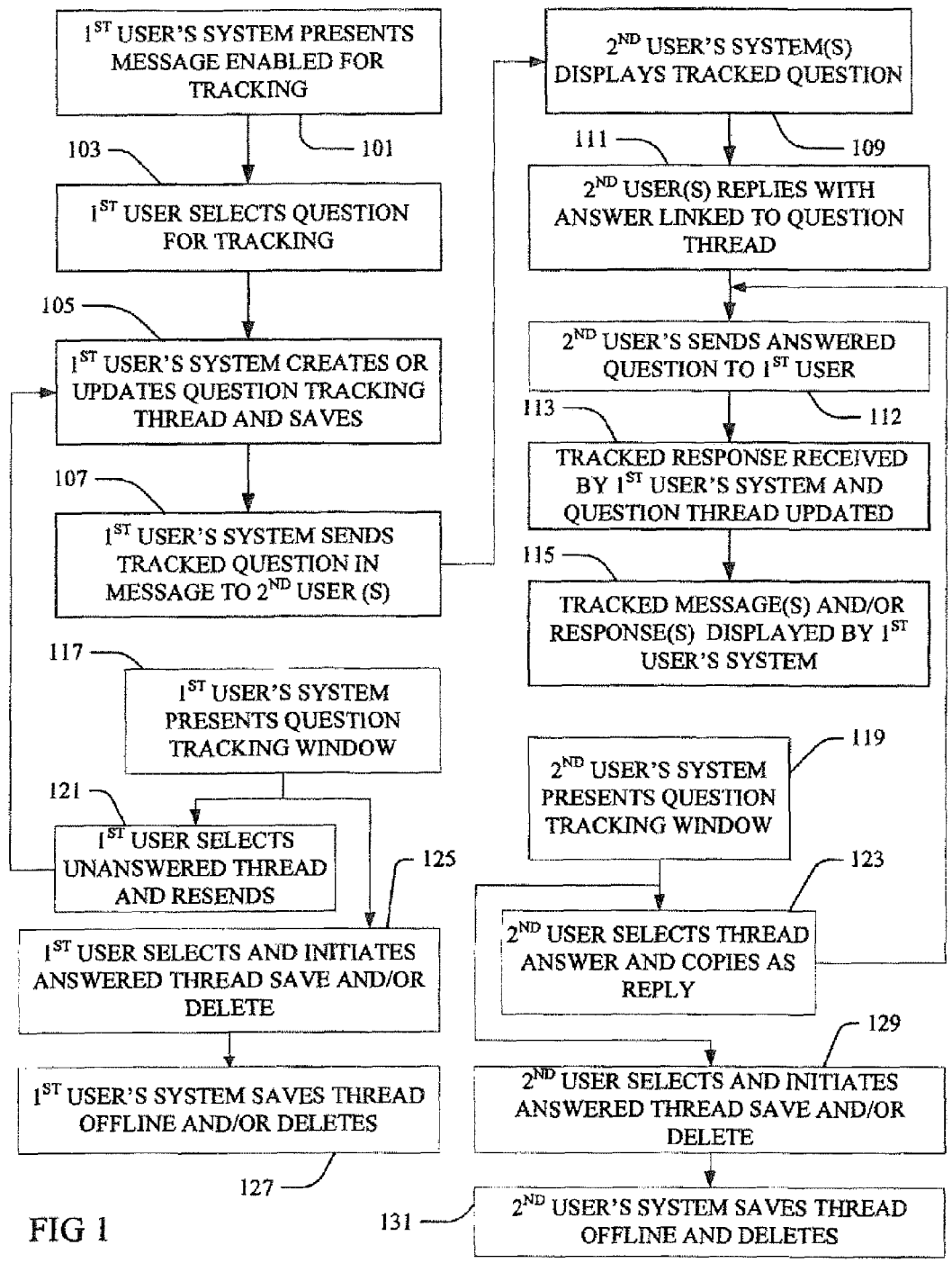
FIG. 1 is a block diagram illustrating a process and system for selectively synchronizing and tracking networked or internet communication message components and their responses according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections: I. General Description; and II. Computerized Implementation.

I. General Description.

FIG. 1 illustrates a process for selectively synchronizing and tracking text-based networked or internet communication messages and their responses. At 101 a first user's computer display device presents a communication application message interface configured for selection of a message or message item for synchronizing and tracking options according to the present invention. The present embodiment provides advantages for real-time text-based interactive communication applications such as Internet Relay Chat (IRC), Instant Messaging (IM), Web Browser, Chat-room and ICQ (a pseudo-acronym for "I seek you" real-time presence detection and communications services). However, the invention is also appropriate for use with other communication applications, for example including non-real-time or delayed communication applications such as internet Web Logs or Blogs, bulletin boards, email and other messaging applications wherein message sending and receiving by respective users may occur over extended or different sessions and during different log-on or page-view actions. Thus, it will be apparent to one skilled in the art that the present invention is not limited to the specific examples described herein.

At 103 the first user initiates tracking of a message by selecting a message or a discrete message item such as one or more questions or answers within a message for tracking. Initiation of message tracking may occur in variety of ways. In some examples, message presentation at 101 includes a tool bar with one or more action buttons selectable through a cursor selection and "click" operation, wherein a user initiates the tracking function by clicking on a tool bar button when a message or message portion or component is active, for example text entered into a text input dialog box field in the case of a new outgoing message, or after selecting all or part of a displayed previous incoming or outgoing message, or user name in the case of an incoming message, through a cursor operation. In some embodiments, the cursor selection and tool bar clicking operation results in the selected item being highlighted, which may provide tracking advantages as are more fully described below.

In some embodiments, tracking of messages is initiated by entering special text string inputs in new message text entry operations. In one example, a user brackets a text message or a portion of the message such as a question or answer with a special text string character or character pair, for example with an initial character pair "{{" and an ending character pair "}}". Entry of a single character combination or text item may also cause message tracking, for example the term "TR@CK" inserted anywhere with a text entry routine may be detected by the communication application and thereby initiate tracking of a message or message portion (for example a question or answer) including the tracking term.

In contrast to prior art methods, the present invention thus enables tracking and synchronization of message portions smaller than an entire message item, and furthermore independent of a message identity or totality. For example, a single message from a user may comprise multiple questions, statements, sentences, etc. Rather than highlight and/or track an entire message, a user need select only a question, answer or other text item of interest contained within an outgoing message or within a previous message and thus track only that portion of the message. Thus, in one example, if a previous message contains a plurality of questions, and one question remains unanswered, the user may select only the unanswered question for tracking and synchronization with a later subsequent answer. This is contracted with prior art tracking methods such as email importance flags that are able to mark or categorize only entire complete messages. (It will be understood that the term "question" as used herein may refer to any text word, phrase or statement proffered in an interactive conversation or communication to initiate a responsive reply or message, and the term "answer" as used herein may refer to any text word, phrase or statement proffered in an interactive conversation or communication in reply to a question or other message or message item.)

At 105 initiation of tracking creates a tracking thread for a question newly entered or selected by the first user, or an existing tracking thread is updated if the selected message or message item is an answer responsive to or associated with a previous message question already associated with the existing tracking thread, and the new or revised tracking thread is saved to a memory means. The tracking thread comprises data useful for message tracking: illustrative examples include message creation or sending timestamps; all or portions of (such as highlighted portions of) the message text; unique user ID data, for example the sending first user ID and/or receiving user IDs of users for whom the message is directed to or from whom a selected output/received message is received; an answer or reply status (in some embodiments this is defaulted to an "unanswered" status for an out-going message input); and a reply message field or dialog box, which in the case of an outgoing message created and inputted at 103 is left blank and reserved for entry of message text from any reply message received from a replying party or other communicating entity. Other useful tracking data will be apparent to one skilled in the art, and the present invention is not limited to the specific examples described herein At 107 the first user's system sends a message comprising the tracked question to one or more second communication application users through a network, internet or other communication medium and at 109 the tracked question is displayed to a receiving second user by the second user's computer system through the communication application as configured by the present invention. The tracked question may be marked or otherwise displayed to the receiving user to indicate that it is being tracked by the sender. In one example, a portion or all of a tracked question is displayed with a special visual effect (e.g. highlighting text in a different color). Thus, by distinctive marking the question stands out from other non-tracked question, providing distinctiveness. Moreover, the second user is quickly and readily informed that the first user is tracking responses or status of the tracked question, which may encourage a prompt reply or processing of the question, perhaps partially in response to a first user status relative to the receiving second user. Alternatively, tracked question displayed to a receiver at 109 may be unmarked or otherwise not distinguished from non-tracked messages.

At 111 the second user replies to the received question by linking an answer to the question thread, initiating sending of the linked answer to the first user's system by the second user's system at 112. In one embodiment, the second user explicitly links the answer to the question, for example by entering the answer into a text dialog box and then clicking on or otherwise selecting the displayed tracked question. In other embodiments, the answer is automatically associated with the tracked question: for example the tracked question may be displayed to the second user with an associated answer dialog box, with entry of the answer automatically linking the answer to the tracked question.

At 113 the linked answer is received by the first user's system which responsively updates the tracked question thread, including in some examples setting a tracking thread answer status field to "answered". And at 115 the first user's system displays the answer to the first user in association with the linked instigating question, in some embodiments through a special visual effect display distinguishing the tracked message and/or linked response from other non-tracked messages or responses. Thus, the first user is quickly and readily informed of his instigating question as well as the responsive answer, eliminating any confusion as to the relevance of the received response with respect to the question or questions sent by the first user.

In another aspect, the communication applications are configured by the present invention also display a composite or secondary tracking display to the first user at 117 and to the second user at 119, presenting each of a plurality of tracked question threads in a window or other display. In one example, a question and answer (Q&A) tracking window is evoked by the first or second users at 117 or 119 in response to clicking a tracked messages display button in a tool bar, the Q&A tracking window comprising a table of all tracked questions, in some embodiments also containing display columns showing question or thread properties as described above, and optionally other thread properties. In other embodiments, the secondary tracking display is configured to be displayed unless the user chooses to hide or close the display.

Questions and question threads may be further organized and presented with respect to other characteristics that may be useful to the user and provide information processing and review efficiencies. For example, in some embodiments a Q&A tracking table contains rows of marked question threads grouped by Answerers (other users queried by the present user), and rows of answered question threads grouped by Questioners (other users querying the present user). A tracking window thus configured provides quick and efficient management information, for example notice that a listed party is presently non-responsive in multiple threads, which may indicate a prolonged absence from an interactive communication application or incorrect messaging addressing and transmission, thus giving the user notice of a communication problem with respect to one or more outstanding tracked messages.

Users may use the secondary tracking display to readily ascertain the status of pluralities of tracked question threads and efficiently process the tracked threads accordingly. Thus, at 121 the first user may select an unanswered question and initiate resending of the question at 105. And at 123 the second user may select and system copy an answer from a first question thread or other displayed text items and enter the selection as the answer to a second question thread and send the answer and updated question thread to the first user at 112.

The secondary tracking display enables other data management options. Thus, at 125 the first user may select an answered question thread to remove it from the tracking display, optionally also saving the answered thread to an off-line storage medium at 127, the deleting or the saving of the answered thread also enabling removal the answered thread from on-line or temporary memory means (such as volatile or cache memory means) to free up system resources. And at 129 the second user selects an answered question and saves it to an off-line storage medium at 131 and/or optionally deletes the answered thread, thus also enabling removal the answered thread from on-line or temporary memory means to free up system resources. In some embodiments, the thread "delete" option is limited to the first user/questioner at 125 and is thus omitted from the second user/answerer options at 129. This configuration provides accountability to the first user/questioner who may ensure that an asked question has actually been responsively or correctly answered, and avoids confusion by preventing the second user/answerer from mistakenly or intentionally deleting a question thread, and thus prevents disputes with a second user/answerer as to whether a question has been answered or even as to whether it had in fact been submitted to the second user/answerer.

Figure 2:
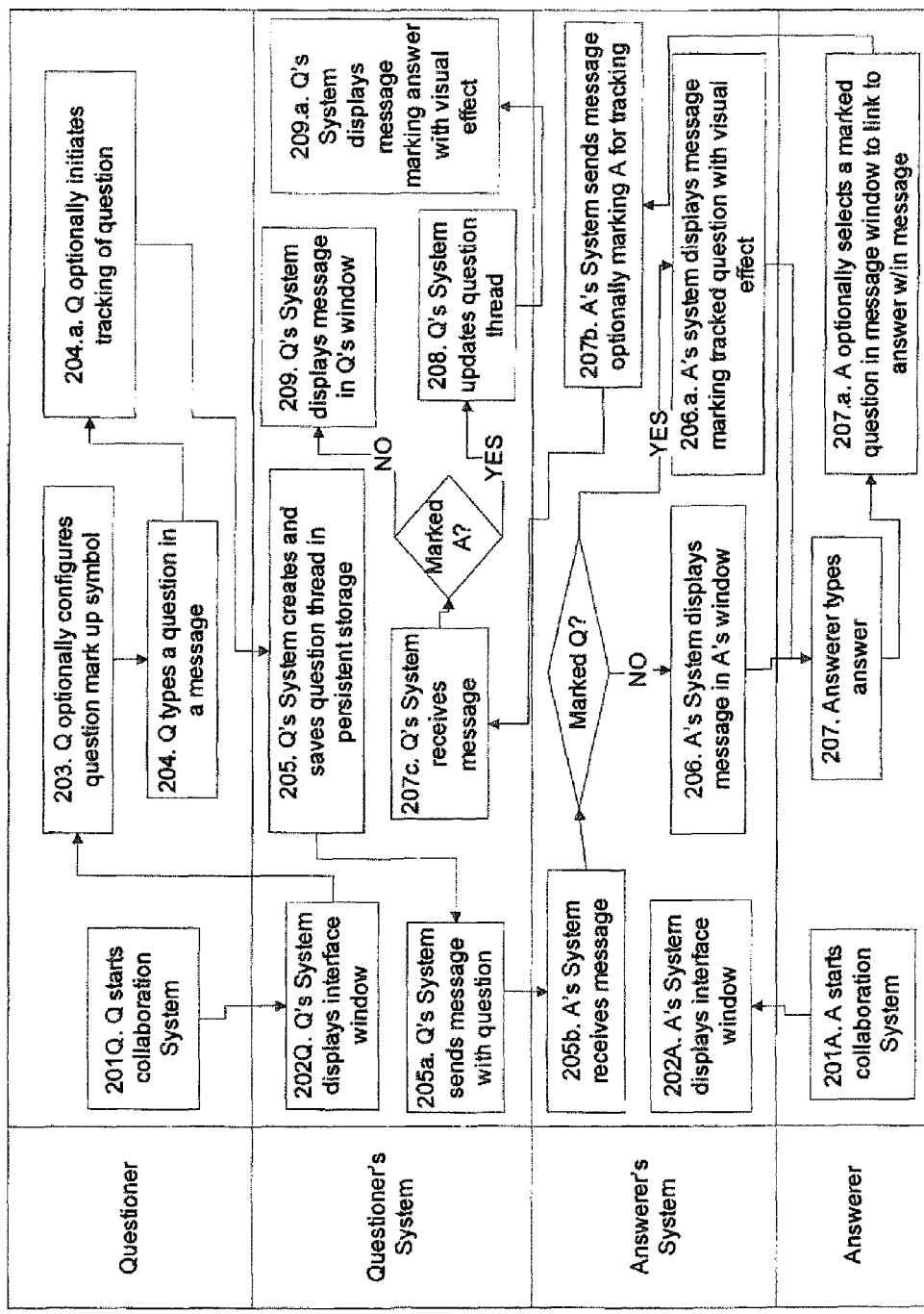
FIG. 2 is a tabular flow chart illustrating an embodiment of the present invention.

FIG. 2 is a flow chart organized in a tabular form illustrating an application of the present invention, for example as illustrated in FIG. 1 and discussed above, in tracking communications between a first user "Questioner" (Q) and a second user "Answerer" (A), and more particularly configured to process both tracked and untracked questions. For illustrative purposes, the flow chart items appear in rows corresponding to a party or entity taking the respective flow chart action: Questioner, Answerer, and Answerer's and Questioner's computer systems each configured to run a collaborative communication system according to the present invention. Thus, in flow chart items 201Q and 201A, each of the Questioner and Answerer initiate said on-line communication system, respectively, and said systems then responsively display a window containing a tool bar, an input text entry area, and an output text display area to each respective user at respective items 202Q and 202A. Next, at 203 the Questioner is presented with the option of configuring a question mark-up symbol for use in tracking messages, for example a unique text symbol combination "{{" and "}}" as discussed above, which the user may utilize for initializing tracking of messages by entry into a text dialog box, either with message text itself or some other dialog box entry. Thus, the present invention enables a user to customize tracking initiation entries as desired.

At 204 the Questioner types in a question within a message, optionally causing the system to track the question within the message at 204a, for example by clicking an appropriate tool bar or other Graphical User Interface (GUI) icon or marking up the question with a text entry such as a unique text symbol combination created at item 203. If the question is marked for tracking at 204a, then at 205 the Questioner's System creates and saves a thread for the question in a memory means, in the present example filling in timestamp, question text, Answerer's ID and unanswered/answered status (defaulted or initialized to unanswered). The Questioner's system then sends the message comprising the question either unmarked (204) or marked and tracked by a question thread (204a and 205) to the Answerer's system at 205a.

At 205b the Answerer's System receives the message and determines whether the message comprises a marked question. If not, then at 206 the Answerer's System displays the message comprising the question to the Answerer, for example in a conventional or otherwise un-marked manner. However, if the message comprises a marked question then at 206a the Answerer's System display the message to the Answerer by displaying the marked question using special visual effect indicating that the question is being tracked by the Questioner (for example, highlighting or flagging the question).

At 207 the Answerer creates a reply message comprising an answer to the question, for example by typing an answer into a text-entry dialog box or selecting a text answer from a displayed message, a table or menu of prewritten answers or some other saved text item means. If the question is marked for tracking by the Questioner's system at 204a, then the Answerer may select the marked question and link his answer to the question at 207a, and as discussed above the linking action may be explicit or automatic. At 207b the Answerer's system then sends the reply message to the Questioner's system, which may further comprise a link of the answer to the marked question and a marking of the answer as affected by 207a.

At 207c the Questioner's System receives the reply message and determines whether the reply comprises a marked and linked answer: if not, then at 209 the Questioner's System displays the message comprising the answer to the Questioner, for example in a conventional or otherwise un-marked manner. However, if the reply comprises a marked and linked answer then at 208 the Questioner's System updates the linked question thread, for example setting the linked question's answered/unanswered status field or flag to "answered" and populating a question thread answer field with the text contents of the answer, and at 209a displays the reply to the Questioner by displaying the marked/linked answer using special visual effect indicating that the answer is responsive to the linked question being tracked by the Questioner (for example, highlighting or flagging the answer).

Selective message item tracking (for example, individual questions and answers) provide efficiency advantages. If every message had to be tracked, or every question or other item within a message, the users or their systems may become overwhelmed by excessive tracking information, making message tracking management more onerous, difficult and inefficient in proportion to the number of messages processed by the user. By enabling a user to select subset questions and answers of one or more of his communication messages for tracking, efficiencies in tracking and processing tracked messages increase with a proportionate decease in the relative size of the tracked subset relative to the universe of the user's messages. Moreover, in some embodiments, message tracking may also incorporate multiple categories, with different visual indicators and priorities assigned to each category to provide further management and display options.

Figure 3:
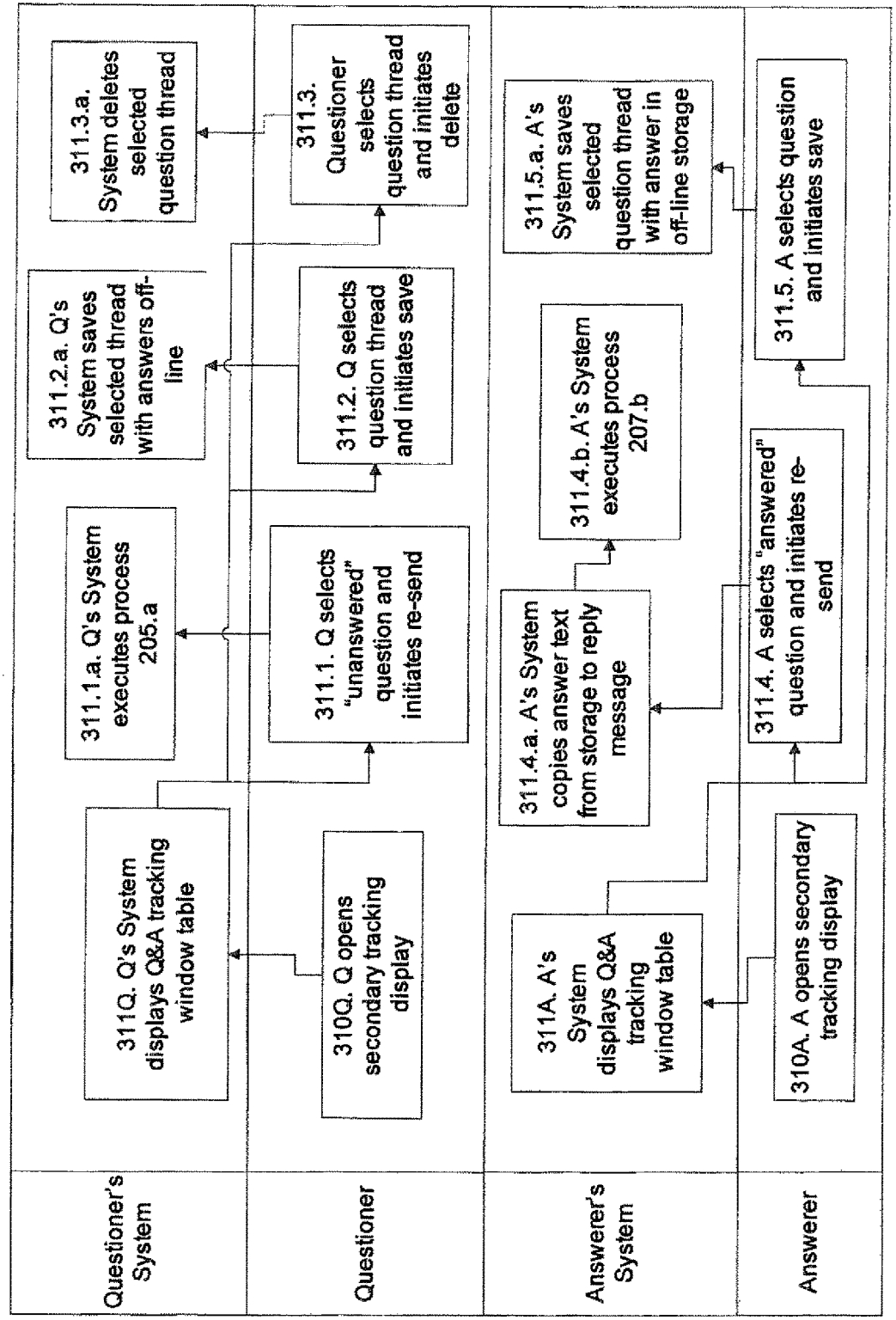
FIG. 3 is a tabular flow chart illustrating an embodiment of the present invention.

FIG. 3 is a flow chart organized in a tabular form illustrating a secondary tracking application according to the present invention, for example as illustrated in FIGS. 1 and 2 and discussed above, configured for tracking and managing multiple messages and communications between "Questioner" and "Answerer" users. As with the tabular illustration in FIG. 2, for illustrative purposes flow chart items appear in rows corresponding to a party or entity taking the respective flow chart action: Questioner, Answerer, and Answerer's and Questioner's computer Systems each configured to run a collaborative communication system according to the present invention. Thus, at 311Q and 311A a Questioner's System and an Answerer's System each respectively display a Q&A tracking window comprising a plurality of tracked questions and answers and configured for their respective Questioner and Answerer users, in the present example in response to each user respectively opening the tracking windows at 310Q and 310A, for example by clicking on a tracked items button in their toolbars.

The Questioner System and Answerer System each offer a number of action options to their respective Questioner and Answerer users with respect to tracked items through the secondary tracking display options. Thus, the Questioner may select an unanswered question from the Q&A tracking window display and initiate resending or resubmission of a tracked question to the Answerer at 311.1, for example by clicking a "resend" toolbar button, thereby causing the Questioner's System to resend the unanswered question at 311.1.a through the process at 205.a of FIG. 2. The Questioner may also select a question and initiate saving of the question thread (including any linked answer) at 311.2, for example by clicking a "save" toolbar button, which causes the Questioner's System to save the question thread (along with its response in the case of an answered question) off-line, for example at some archival or other permanent storage means, at 311.2.a. And the Questioner may also select a question and initiate deletion of the question and its thread (and any linked answer) at 311.3, for example by clicking a "delete" toolbar button, thereby causing the Questioner's System to delete the question and its question thread at 311.3.a.

The Answerer is also presented with a number of message management options through the secondary tracking display. For example, a previously sent linked answer may not be reflected as received by the appropriate Questioner: the Answerer may accordingly select a marked and linked answer from the Q&A tracking window display and initiate resending or resubmission of the linked answer and tracked question to the tracking Questioner at 311.4, for example by clicking a "resend" toolbar button. In one example, the Answerer selects an answer for the secondary display, for example from another question/answer thread or from another set of pre-composed answers in a storage means and initiates a copying of the answer text and populating and linking of the copied text to an answer field for association with the tracked question at 311.4.a. At 311.4.b the Answerer's System then resends a previous answer or the new copied answer to the Questioner's System through the process 207.b of FIG. 2. The Answerer may also select a question/answer thread and initiate a save at 311.5, for example by clicking a "save" toolbar button at flow chart, thereby causing the Answerer's System to save the message thread off-line at 311.5.a, for example at some archival or other permanent storage means.

II. Computerized Implementation.

Figure 4:
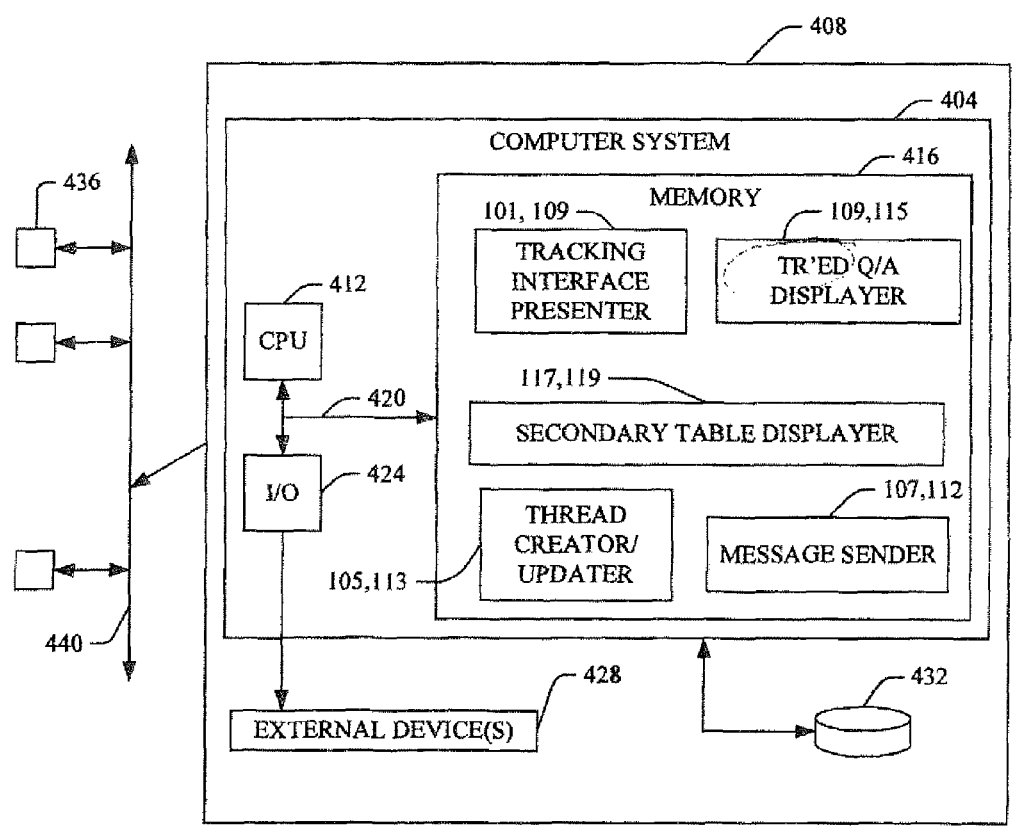
FIG. 4 is a block diagram illustrating an exemplary computerized implementation of a system and method for selectively synchronizing and tracking networked or internet communication message components and their responses according to the present invention.

The present invention may be implemented within a stand-alone on-line collaborative application, or as a plug-in to an existing on-line collaborative application. Referring now to FIG. 4, an exemplary computerized implementation includes a computer system 404 deployed within a computer infrastructure 408 such as a computer or a programmable device such as a personal digital assistant (PDA) or cellular phone. This is intended to demonstrate, among other things, that the present invention could be implemented within a network environment 440 (e.g., the Internet, a wide area network (WAN), a local area network (LAN), a virtual private network (VPN), etc.) in communication with one or more additional computers 436, or on a stand-alone computer system 408. In the case of the former, communication throughout the network 440 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 404 includes a central processing unit (CPU) 412, a memory 416, a bus 420, and input/output (I/O) interfaces 424. Further, the computer system 404 is shown in communication with external I/O devices/resources 428 and storage system 432. In general, the processing unit 412 executes computer program code, such as the code to implement various components of the process and system for selectively synchronizing and tracking networked or internet communication messages and their responses illustrated in FIGS. 1, 2 and 3 and described above, including a question and answer tracking interface presenter 101, 109; a tracked question and answer display or highlighter 109, 115; a secondary tracking table displayer 117, 119; a thread creator/updater 105, 113; and a tracked-item message sender 107, 112 as discussed above, which are stored in memory 416 and/or storage system 432. It is to be appreciated that two or more, including all, of the components 101, 105, 107, 109, 112, 113, 115, 117 and 119 may be implemented as a single component.

While executing computer program code, the processing unit 412 can read and/or write data to/from the memory 416, the storage system 432, and/or the I/O interfaces 424. The bus 420 provides a communication link between each of the components in computer system 404. The external devices 428 can comprise any devices (e.g., keyboard, pointing device, display, etc.) that enable a user to interact with computer system 404 and/or any devices (e.g., network card, modem, etc.) that enable computer system 404 to communicate with one or more other computing devices.

The computer infrastructure 408 is only illustrative of various types of computer infrastructures for implementing the invention. For example, in one embodiment, computer infrastructure 408 comprises two or more computing devices (e.g., a server cluster) that communicate over a network to perform the various process steps of the invention. Moreover, computer system 404 is only representative of various possible computer systems that can include numerous combinations of hardware.

To this extent, in other embodiments, the computer system 404 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 412 may comprise a single processing unit, or be distributed across one or more processing units in one or more locations, e.g., on a client and server. Similarly, the memory 416 and/or the storage system 432 can comprise any combination of various types of data storage and/or transmission media that reside at one or more physical locations.

Further, I/O interfaces 424 can comprise any system for exchanging information with one or more of the external device 428. Still further, it is understood that one or more additional components (e.g., system software, math co-processing unit, etc.) not shown in FIG. 4 can be included in computer system 404. However, if computer system 404 comprises a handheld device or the like, it is understood that one or more of the external devices 428 (e.g., a display) and/or the storage system 432 could be contained within computer system 404, not externally as shown.

The storage system 432 can be any type of system (e.g., a database) capable of providing storage for information under the present invention. To this extent, the storage system 432 could include one or more storage devices, such as a magnetic disk drive or an optical disk drive. In another embodiment, the storage system 432 includes data distributed across, for example, a local area network (LAN), wide area network (WAN) or a storage area network (SAN) (not shown). In addition, although not shown, additional components, such as cache memory, communication systems, system software, etc., may be incorporated into computer system 404.

While shown and described herein as a method and a system, it is understood that the invention further provides various alternative embodiments. For example, in one embodiment, the invention provides a computer-readable/useable medium that includes computer program code to enable a computer infrastructure to synchronize and track networked or internet communication messages and their responses. To this extent, the computer-readable/useable medium includes program code that implements each of the various process steps of the invention.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 416 and/or the storage system 432 (e.g., a fixed disk, a read-only memory, a random access memory, a cache memory, etc.).

Still yet, computer infrastructure 408 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 408 that performs the process steps of the invention for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for selectively synchronizing and tracking networked or internet communication messages and their responses. In this case, a computer infrastructure, such as computer infrastructure 408, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 404, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer implemented method for selectively synchronizing and tracking networked or internet real-time interactive communication message items, the method comprising executing on a processing unit the steps of:

presenting a real-time interactive communication system message entry interface to a first user that displays in real-time a plurality of chat or instant message text messages of a conversation with a second user comprising outgoing messages from the first user and incoming messages from a second user in reply to the outgoing text messages by displaying each new message immediately after a most recent previous outgoing or incoming message in one chat or instant message window, wherein each of the messages comprise a plurality of discrete message text items;

in response to detecting an entry of a character combination text string comprising a unique text item term by the first user via a text entry routine into a portion of one of the outgoing messages from the first user, creating a question tracking thread for the outgoing message portion, the question tracking thread comprising the character combination text string, a query message timestamp, question text, second user identification data, an answered status initialized to unanswered, and a reply message answer field, and sending the outgoing message portion comprising the character combination text string to the second user through a communication medium; and updating the created question tracking thread by entering answer text into the reply message answer field and setting the answered status to answered in response to receiving a reply text message comprising a text dialog box entry of the answer text that is sent back to the first user by the second user and that is linked by to the outgoing message portion comprising the character combination text string sent to the second user.

2. The method of claim 1, further comprising:

integrating computer-readable program code into a computer system comprising the processing unit, a computer readable memory in circuit communication with the processing unit, and a computer readable storage medium in circuit communication with the processing unit; and wherein the processor executes program code instructions stored on the computer-readable storage medium via the computer readable memory and thereby performs the steps of presenting the real-time interactive communication system message entry interface to a first user that displays in real-time the plurality of chat or instant message text messages of the conversation with the second user comprising the outgoing messages from the first user and the incoming messages from the second user in reply to the outgoing text messages, creating the question tracking thread for the outgoing message portion in response to detecting the entry of the character combination text string comprising the unique text item term by the first user via the text entry routine into the portion of one of the outgoing messages from the first user, and updating the created question tracking thread by entering the answer text into the reply message answer field and setting the answered status to answered in response to receiving the reply text message comprising the text dialog box entry of the answer text that is sent back to the first user by the second user and that is linked by to the outgoing message portion comprising the character combination text string sent to the second user.

3. The method of claim 1, further comprising executing on the processing unit the step of:

in response to the updating of the created question tracking thread answered status to answered, visually distinguishing a display of the answer text entered into the reply message answer field in association with the outgoing message comprising the character combination text string to the first user from a display of a remainder of the plurality of chat or instant message text messages within the one chat or instant message display window.

4. The method of claim 3, further comprising executing on the processing unit the step of:

in response to the first user entering the character combination text string input into the one of the outgoing messages, visually distinguishing the outgoing message comprising the character combination text string in the display window from a remainder of the plurality of chat or instant message text messages that do not comprise the character combination text string input.

5. The method of claim 4, further comprising executing on the processing unit the steps of:

organizing and presenting each of a plurality of unanswered outgoing message portions comprising the character combination text string in association with different users that receive each of the plurality of unanswered outgoing message portions sent by the first user.

6. The method of claim 5, further comprising executing on the processing unit the steps of:
  enabling the first user to resend an unanswered outgoing message portion comprising the character combination text string to the second user by selecting a displayed unanswered outgoing message portion comprising the character combination text string and entering a resend prompt into the message entry interface;
  enabling the first user to save an unanswered outgoing message portion comprising the character combination text string to an off-line storage means by selecting a displayed unanswered outgoing message portion comprising the character combination text string and entering a save prompt into the message entry interface; and
  enabling the first user to delete an unanswered outgoing message portion comprising the character combination text string by selecting a displayed unanswered outgoing message portion comprising the character combination text string and entering a delete prompt into the message entry interface.

7. The method of claim 6 wherein the outgoing message portion comprising the special text string is smaller than an entire message comprising the message portion;
  wherein the real-time interactive communication system message entry interface is an internet relay chat, an instant messaging, a chat-room or an ICQ application interface; and
  wherein the real-time interactive communication system message entry interface is not a web log, a web blog, a bulletin board, or an email application interface.

8. The method of claim 7, further comprising executing on the processing unit the step of:
  pushing older messages out of the display window to make room for newly received or sent text messages.

9. The method of claim 8, wherein the character combination text string input comprises an initial character combination text string and an ending character combination text string that bracket the outgoing message portion, and wherein the initial character combination text string is different from the ending character combination text string.

10. An article of manufacture, comprising:
  a computer readable tangible storage medium having computer readable program code embodied therewith, wherein the computer readable storage medium is not a transitory signal per se, the computer readable program code comprising instructions for execution by a processing unit that cause the processing unit to:
  present a real-time interactive communication system message entry interface to a first user that displays in real-time a plurality of chat or instant message text messages of a conversation with a second user comprising outgoing messages from the first user and incoming messages from a second user in reply to the outgoing text messages by displaying each new message immediately after a most recent previous outgoing or incoming message in one chat or instant message window, wherein each of the messages comprise a plurality of discrete message text items;
  in response to detecting an entry of a character combination text string comprising a unique text item term by the first user via a text entry routine into a portion of one of the outgoing messages from the first user, create a question tracking thread for the outgoing message portion, the question tracking thread comprising the character combination text string, a query message timestamp, question text, second user identification data, an answered status initialized to unanswered, and a reply message answer field, and send the outgoing message portion comprising the character combination text string to the second user through a communication medium; and
  update the created question tracking thread by entering answer text into the reply message answer field and setting the answered status to answered in response to receiving a reply text message comprising a text dialog box entry of the answer text that is sent back to the first user by the second user and that is linked by to the outgoing message portion comprising the character combination text string sent to the second user.

11. The article of manufacture of claim 10, the program code further comprising instructions for execution by the processing unit that cause the processing unit to, in response to the update of the created question tracking thread answered status to answered, visually distinguish a display of the answer text entered into the reply message answer field in association with the outgoing message comprising the character combination text string to the first user from a remainder of the plurality of chat or instant message text messages within the one chat or instant message display window.

12. The article of manufacture of claim 11, the program code further comprising instructions for execution by the processing unit that cause the processing unit to, in response to the first user entering the character combination text string input into the one of the outgoing messages, visually distinguish the outgoing message comprising the character combination text string in the display window from a remainder of the plurality of chat or instant message text messages that do not comprise the character combination text string input.

13. The article of manufacture of claim 12, the program code further comprising instructions for execution by the processing unit that cause the processing unit to:
  resend an unanswered outgoing message portion comprising the character combination text string to the second user in response to the first user selecting a displayed unanswered outgoing message portion comprising the character combination text string and entering a resend prompt into the message entry interface;
  save an unanswered outgoing message portion comprising the character combination text string to an off-line storage means in response to the first user selecting a displayed unanswered outgoing message portion comprising the character combination text string and entering a save prompt into the message entry interface; and
  delete an unanswered outgoing message portion comprising the character combination text string in response to the first user selecting a displayed unanswered outgoing message portion comprising the character combination text string and entering a delete prompt into the message entry interface.

14. A system, comprising:
  a processing unit;
  a memory in circuit communication with the processing unit;
  a computer-readable storage medium in circuit communication with the processing unit; and
  a network interface in circuit communication with the processing unit;

wherein the processing unit executes program instructions stored on the computer-readable storage medium via the computer readable memory and thereby:

presents a real-time interactive communication system message entry interface to a first user that displays in real-time a plurality of chat or instant message text messages of a conversation with a second user comprising outgoing messages from the first user and incoming messages from a second user in reply to the outgoing text messages by displaying each new message immediately after a most recent previous outgoing or incoming message in one chat or instant message window, wherein each of the messages comprise a plurality of discrete message text items;

in response to detecting an entry of a character combination text string comprising a unique text item term by the first user via a text entry routine into a portion of one of the outgoing messages from the first user, creates a question tracking thread for the outgoing message portion, the question tracking thread comprising the character combination text string, a query message timestamp, question text, second user identification data, an answered status initialized to unanswered, and a reply message answer field, and sends the outgoing message portion comprising the character combination text string to the second user through a communication medium; and updates the created question tracking thread by entering answer text into the reply message answer field and setting the answered status to answered in response to receiving a reply text message comprising a text dialog box entry of the answer text that is sent back to the first user by the second user and that is linked by to the outgoing message portion comprising the character combination text string sent to the second user.

15. The system of claim 14, wherein the processing unit executes the program instructions stored on the computer-readable storage medium via the computer readable memory and thereby further, in response to the update of the created question tracking thread answered status to answered, visually distinguishes a display of the answer text entered into the reply message answer field in association with the outgoing message comprising the character combination text string to the first user from a remainder of the plurality of chat or instant message text messages within the one chat or instant message display window.

16. The system of claim 15, wherein the processing unit executes the program instructions stored on the computer-readable storage medium via the computer readable memory and thereby further, in response to the first user entering the character combination text string input into the one of the outgoing messages, visually distinguishes the outgoing message comprising the character combination text string in the display window from a remainder of the plurality of chat or instant message text messages that do not comprise the character combination text string input.

17. The system of claim 16, wherein the processing unit executes the program instructions stored on the computer-readable storage medium via the computer readable memory and thereby further organizes and presents each of a plurality of unanswered outgoing message portions comprising the character combination text string in association with different users that receive each of the plurality of unanswered outgoing message portions sent by the first user.

18. The system of claim 17, wherein the processing unit executes the program instructions stored on the computer-readable storage medium via the computer readable memory and thereby further:

resends an unanswered outgoing message portion comprising the character combination text string to the second user in response to the first user selecting a displayed unanswered outgoing message portion comprising the character combination text string and entering a resend prompt into the message entry interface;

saves an unanswered outgoing message portion comprising the character combination text string to an off-line storage means in response to the first user selecting a displayed unanswered outgoing message portion comprising the character combination text string and entering a save prompt into the message entry interface; and deletes an unanswered outgoing message portion comprising the character combination text string in response to the first user selecting a displayed unanswered outgoing message portion comprising the character combination text string and entering a delete prompt into the message entry interface.

19. The system of claim 18, wherein the outgoing message portion comprising the special text string is smaller than an entire message comprising the message portion;

wherein the real-time interactive communication system message entry interface is an internet relay chat, an instant messaging, a chat-room or an ICQ application interface; and wherein the real-time interactive communication system message entry interface is not a web log, a web blog, a bulletin board, or an email application interface.

20. The system of claim 19, wherein the character combination text string input comprises an initial character combination text string and an ending character combination text string that bracket the outgoing message portion, and wherein the initial character combination text string is different from the ending character combination text string.

* * * * *